United States Patent [19]
Vollbrecht et al.

[11] Patent Number: 5,607,755
[45] Date of Patent: Mar. 4, 1997

[54] IMITATION LEATHER WHICH CAN BE MOLDED ON THE BACK

[75] Inventors: Michael Vollbrecht, Nienburg; Gustav Hildebrandt, Auetal; Hans-Hinrich Kruse, Hulsede; Axel Bruder, Burgwedel, all of Germany

[73] Assignee: Benecke-Kaliko AG, Hanover, Germany

[21] Appl. No.: 460,839

[22] Filed: Jun. 5, 1995

Related U.S. Application Data

[63] Continuation of Ser. No. 55,367, May 3, 1993, abandoned.

[30] Foreign Application Priority Data

May 4, 1992 [DE] Germany ............... 42 14 588.0

[51] Int. Cl.⁶ ............................................. B32B 5/16
[52] U.S. Cl. .................... 428/217; 428/105; 428/114; 428/212; 428/218; 428/904
[58] Field of Search ..................... 428/31, 105, 109, 428/110, 114, 212, 217, 218, 247, 904

[56] References Cited

U.S. PATENT DOCUMENTS

| | | | |
|---|---|---|---|
| 4,132,821 | 1/1979 | Hiers et al. | 428/151 |
| 4,159,360 | 6/1979 | Kim | 428/195 |
| 4,204,017 | 5/1980 | Hefele | 428/160 |
| 4,302,495 | 11/1981 | Marra | 428/110 |
| 4,450,196 | 5/1984 | Kamat | 428/197 |
| 4,613,538 | 9/1986 | Wendell et al. | 428/198 |

FOREIGN PATENT DOCUMENTS

| | | |
|---|---|---|
| 2094136 | 8/1971 | France . |
| 2214236 | 3/1972 | Germany . |
| 3129145 | 7/1981 | Germany . |
| 3335669 | 9/1983 | Germany . |
| 3419867 | 6/1984 | Germany . |
| 3608781 | 3/1986 | Germany . |
| 62-162081 | 1/1988 | Japan . |

Primary Examiner—Kathleen Choi
Attorney, Agent, or Firm—Cushman Darby & Cushman Intellectual Property Group of Pillsbury Madison & Sutro LLP

[57] ABSTRACT

A method for producing imitation leather which can be injection molded from the back as well as such imitation leather which can be injection molded from the back are disclosed. The imitation leather comprises a web layer with a decorative layer. In a first operational cycle, an open plastic framework is inserted into the web layer over the side of the web layer facing away from the decorative layer and subsequently, in one or a plurality of further operational cycles, one or a plurality of further open plastic frameworks are inserted. The surface of the web layer forms an adhesion layer for and at the same time a barrier against the injection molding compound. The resilience of the imitation leather is retained.

7 Claims, 1 Drawing Sheet

IMITATION LEATHER WHICH CAN BE MOLDED ON THE BACK

This is a continuation of application Ser. No. 08/055,367, filed on May 3, 1993, which was abandoned upon the filing hereof application Ser. No. 08/460,839.

FIELD OF THE INVENTION

The invention relates to a method for producing imitation leather, the back of which can be injection molded and comprises a web layer with a decorative layer. The invention also relates to such imitation leather which can be molded on the back.

BACKGROUND OF THE INVENTION

Imitation leather is distinguished by its abrasion resistance, imperviousness to moisture and a soft and supple feel of the material, and for these reasons is especially suited for outfitting the interior of motor vehicles. A substrate body of polyolefin, acrylnitril butadiene styrene (ABS) or other customary injection molding compound is used for establishing the permanent shape. However, connecting the imitation leather, comprising a web layer with a decorative layer, with the substrate body entails considerable difficulties. If the imitation leather, which was placed in a prepared mold, is injection molded on the back of the leather, destruction of the web layer occurs, particularly in the area of the injection points of the mold, and this causes the decorative layer to partially collapse. In addition, the injected compound results in the undesirable hardening of the web layer, thus causing the soft and supple feel of the material to be lost.

SUMMARY OF THE INVENTION

An object of the invention is to provide a method for producing imitation leather, the back of which can be injection molded. Injection molding can occur directly on the back without disadvantageous changes of the properties of the material.

This object is attained with the method of the invention which is a method for producing imitation leather, the back of which can be injection molded and comprises a web layer with a decorative layer, wherein a first operational cycle an open plastic framework is inserted into the web layer on the side of the web layer facing away from the decorated layer and subsequently another or a plurality of plastic frameworks are inserted in one or a plurality of operational cycles.

An adhesion surface for the injection molding compound used for back injection is created by means of plastic frameworks inserted into the web layer in several process cycles, and at the same time a barrier which prevents too deep penetration of the injection molding compound into the web layer. By means of this feature the injection molding compound can no longer cause the presently known destruction in the web layer in the area of the injection points of the mold where particularly high pressure occurs. In addition, hardening of the web material is prevented, because the injection molding compound mainly adheres to the surface of the web layer facing away from the decorative layer. The characteristic "open" indicates that the plastic framework does not form a closed surface, instead the surface contains numerous breaks. Because of this the imitation leather is not hardened in an unwanted manner by the plastic frameworks themselves, but essentially maintains the soft and supple properties of the material.

Inserting the plastic framework in several operational cycles makes it possible to achieve the required barrier effect against penetrating injection molding compound, but without causing an undesirable thickness of the plastic framework in the interior of the web layer. However, hardening of the edge areas on the side of the web layer facing away from the decorative layer does not negatively affect the resilience of the imitation leather.

In accordance with a further embodiment, the plastic frameworks are inserted offset from each other from one operational cycle to the next.

Because of this it is possible to achieve a sufficient covering of the surface and thus a sufficient barrier effect against penetration by injection molding compound into the web layer, even with coarse framework structures.

It is also provided that the thickness of the structure of the plastic framework is increased from one operational cycle to the next.

Because the penetration depth of the plastic framework is reduced with every further operational cycle, it is possible to limit compression of the structure of the plastic framework, which also goes hand in hand with stiffening, to the edge layer of the web layer.

A further embodiment provides that the plastic frameworks are inserted via pressure rollers by filling indentations of profiled pressure rollers with liquid plastic and then sequentially rolling off the pressure rollers on the side of the web layer facing away from the decorative layer.

This method results in inserting the plastic for the formation of the plastic framework in a locally purposeful and metered manner and with even processing quality. In this case the sequentially operating pressure rollers permit a continuous manufacturing process of the imitation leather which can be injection molded on the back.

A further embodiment provides that the viscosity of the liquid plastic is increased from one operational cycle to the next.

This step results in the penetration depth of the plastic to decrease from one operational cycle to the next, so that it is assured that the framework structure obtains its greatest density in the edge layer of the web layer. The density of the structure of the plastic framework increases with decreasing penetration depth.

It is further provided that the pressure of the pressure rollers is reduced from one operational cycle to the next.

By means of this step, too, it is possible to limit the formation of the plastic framework step by step purposefully to the edge layers of the web layer. Thus, all these steps are used to increase the adhesion of the injection molded compound, to prevent the penetration of the injection molded compound into the web layer and thus the destruction of the web layer and to maintain the flexibility and suppleness of the imitation leather.

In connection with the imitation leather molded on the back, it is an object of the invention to provide such imitation leather which can be injection molded on the back without disadvantageous changes of its properties and surface.

This object is attained in the present imitation leather which can be injection molded on the back and comprises a web layer (10) with a decorative layer (12), wherein at least two layers of open plastic framework (14, 16) are disposed within the web layer (10) and partially extend from the side of the web layer (10) facing away from the decorative layer (12) over the cross section of the web layer (10).

By means of the multi-layered open plastic framework it is possible to assign different properties to the individual layers. In this way it is possible to provide, in a boundary layer of the web layer located at the surface, a large adhesion surface for the injection molding compound and to form at the same time a barrier which prevents the penetration of the injection molding compound into the web layer. But the resilience of the web layer is only negligibly affected by the plastic framework themselves, so that the advantageous properties of the material, i.e. the softness and the suppleness, are retained.

In a further embodiment of the invention, the plastic framework can have different penetration depths.

This feature results in one layer of the open plastic framework to extend relatively deep into the web layer, while another or further layers are supported on the first layer and have only a small penetration depth. From the side facing away from the decorated side, this constructions acts as a close-meshed framework surface which has good adhesion and barrier properties in respect to the injection molding compound. Deeper inside the web layer there is only a relatively wide-meshed layer of the plastic framework, which hampers the resilience of the imitation leather only a little or not at all.

In a further embodiment, the depth of the structure of the plastic framework is increased with decreasing penetration depth.

This design, too, enhances the adhesion of the injection molding compound on the surface of the web layer as well as the barrier effect, but restricts the hardening to the edge area of the web layer and therefore does not hamper the resilience of the imitation leather.

In addition, the hardness of the layers of the plastic framework can increase with decreasing penetration depth. This step also causes the deeper web layers, which assure the resilience of the imitation leather, to remain soft and deformable.

The plastic frameworks are offset from each other in accordance with a practical embodiment of the invention.

By means of this it is possible to achieve an overall dense surface even with relatively wide-meshed plastic frameworks, which provides the desired adhesion and barrier effect of the injection molding compound.

A first alternative provides that the plastic frameworks are formed linearly, wherein the lines are differently oriented from layer to layer.

In a second alternative, the plastic frameworks are formed in the shape of a grid.

A third alternative provides that the plastic frameworks are formed in patches.

It is also possible to combine the different designs of the plastic frameworks in different layers, so that all conceivable combinations can be realized.

The advantage of this combination lies in that framework types which have different bending and expansion properties and obtain different barrier effects, can be connected with each other, depending on the penetration depth of the plastic framework into the web layer, in such a way that maximum barrier and adhesion effects of the injection molding compound at the surface of the web layer is attained while, at the same time, the greatest possible resilience is retained for maintaining the soft and supple properties of the imitation leather.

Further developments and advantageous embodiments of the invention ensue from the claims, the further description and the drawings, by means of which the method as well as the imitation leather molded on the back are described.

DETAILED DESCRIPTION OF THE INVENTION

Figure 1:
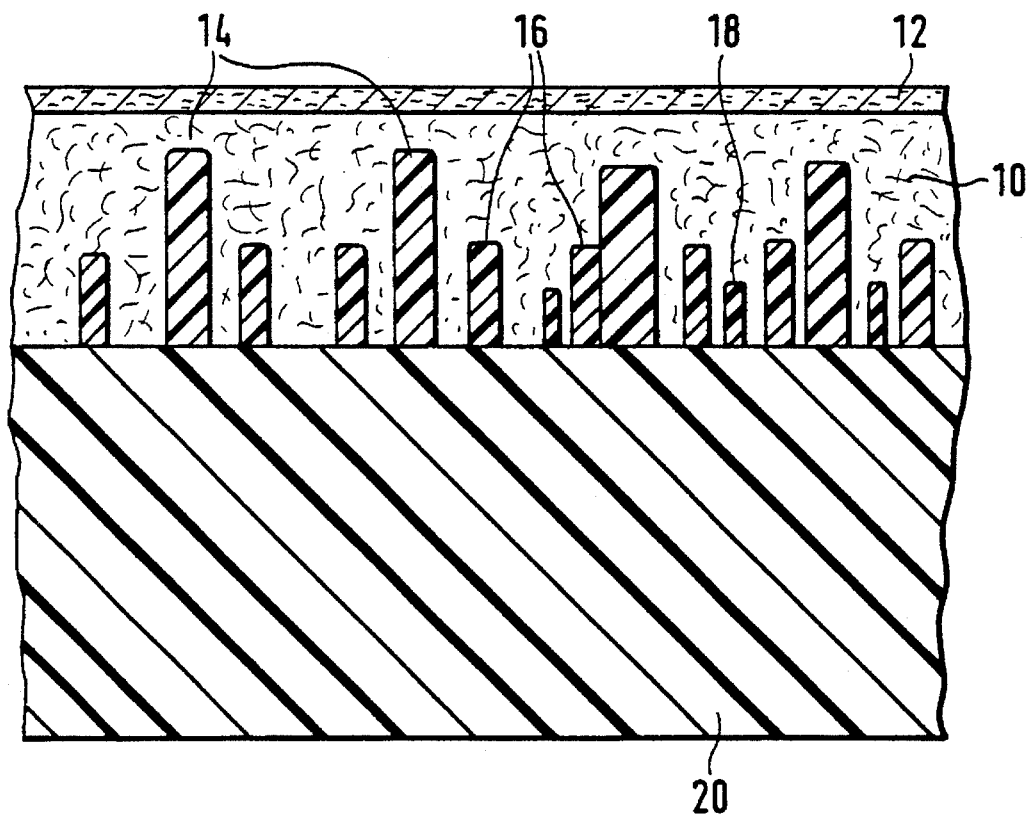
FIG. 1 is a cross sectional view of a piece of imitation leather which can be injection molded on the back in accordance with the invention.

The imitation leather piece which can be injection molded on the back shown in FIG. 1 has a web layer 10 with a decorative layer 12. Open plastic frameworks extend into the web layer from the side of the web layer 12 facing away from the decorative layer 12. The left portion of the drawing shows two layers of the plastic framework 14, 16, while three layers of the plastic framework 14, 16, 18 are disposed on the right side.

The open plastic framework 14, 16, 18 result in that the web layer 10 retains its resilient properties. This would not be the case with impregnation, which would result in a closed surface.

The arrangement of the layers of the plastic framework 14, 16, 18 makes it clear that the density is greatest in the edge area of the web layer 10. Thus, in this location a large adhesion surface is provided for the also indicated substrate layer 20 of an injection molding compound, and at the same time a barrier effect is achieved which prevents the penetration into the web layer 10 of the injection molding compound, injected under high pressure and thus its destruction. Hardening of the edge layer because of the plastic framework is of practically no importance for the resilient properties and the softness and suppleness of the imitation leather.

Figure 2:
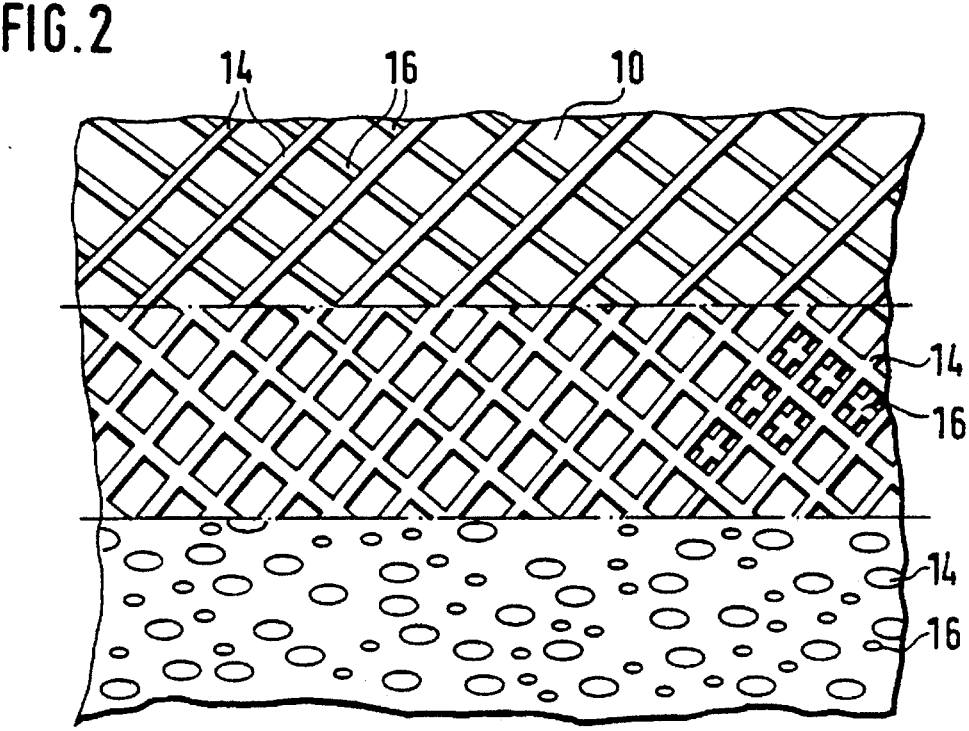
FIG. 2 is a top view of the side of the web layer facing away from the decorative layer, along with a view of the plastic framework.

The top view of the web layer 10 in accordance with FIG. 2 shows different embodiments of the structures of the open plastic framework 14, 16. A linear embodiment of the plastic framework 14, 16 is shown in the upper portion, but the lines of the two layers shown are oriented differently, so that in the top view they cross and form a sort of a grid.

In the center portion the plastic framework 14, 16 of each layer are designed in a grid shape. By offsetting the superimposed layers of the plastic framework 14, 16, such as indicated in the right portion of the drawing, it is possible to result in the mesh density of the grid to be greater than is the case with each individual layer.

Finally, the lower portion shows a patch-like design of the plastic framework 14, 16. This variant is particularly stretchable because the patches are not attached to each other. The covered portion of the surface being used as the adhesion and barrier surface of the injection molding compound is also relatively large here.

Because the illustrated embodiments of the plastic framework 14, 16 can be applied onto and into the web layer in accordance with the pressure process, a very purposeful adjustment of the properties of this framework can be achieved. It is possible in particular to adjust the proportion of the surfaces covered and not covered by the framework by means of the type of pressure rollers employed. In this way and in contrast with other methods it is possible to prevent the creation of an unwanted closed surface and too great a penetration depth, which would have a negative effect on the resilient properties of the imitation leather.

Thus it is possible by means of the described method to reproduce the desired properties of imitation leather, so that a continuously high quality can be achieved during manufacture, while there is little danger of decreasing the quality of the product because of an unintended wrong dosage of the compound used for making the framework.

What is claimed is:

1. Imitation leather comprising:

a web layer having front and back sides, and a decorative layer on said web layer front side which provides said imitation layer with a decorative front, and an open plastic framework disposed substantially within said web layer and substantially flush with said back side and extending toward said decorative layer, said open plastic framework comprising at least two layers penetrating partially into said web layer at different penetration depths, said imitation leather capable of being injection molded from said back side, wherein the hardness of said layers of plastic framework increases with decreasing penetration depth into said web layer.

2. Imitation leather in accordance with claim 1, wherein the density of the structure of said plastic framework increases with decreasing penetration depth into said web layer.

3. Imitation leather in accordance with claim 1, wherein said layers of said plastic framework are offset with respect to each other.

4. Imitation leather in accordance with claim 1, wherein said layers of said plastic framework are linearly embodied and the lines are aligned differently from layer to layer.

5. Imitation leather in accordance with claim 1, wherein said layers of said plastic framework are embodied in a grid shape.

6. Imitation leather in accordance with claim 1, wherein said layers of said plastic framework are embodied in the shape of patches.

7. Imitation leather in accordance with claim 4, wherein said layers of said plastic framework form a combination of plastic frameworks which are embodied in the shape of lines and grids, lines and patches, or grids and patches.

* * * * *